United States Patent
Nagayanagi et al.

(10) Patent No.: US 10,402,347 B2
(45) Date of Patent: Sep. 3, 2019

(54) DATA PROCESSING DEVICE

(71) Applicant: DENSO CORPORATION, Kariya, Aichi-pref. (JP)

(72) Inventors: Keiji Nagayanagi, Kariya (JP); Hirokazu Tsuji, Kariya (JP)

(73) Assignee: DENSO CORPORATION, Kariya (JP)

( * ) Notice: Subject to any disclaimer, the term of this patent is extended or adjusted under 35 U.S.C. 154(b) by 120 days.

(21) Appl. No.: 15/428,185

(22) Filed: Feb. 9, 2017

(65) Prior Publication Data
US 2017/0249264 A1 Aug. 31, 2017

(30) Foreign Application Priority Data
Feb. 26, 2016 (JP) .................................. 2016-35632

(51) Int. Cl.
*G06F 13/42* (2006.01)
*G06F 13/16* (2006.01)

(52) U.S. Cl.
CPC .............. *G06F 13/16* (2013.01); *G06F 13/42* (2013.01)

(58) Field of Classification Search
None
See application file for complete search history.

(56) References Cited

U.S. PATENT DOCUMENTS

| | | | | |
|---|---|---|---|---|
| 2004/0215862 A1* | 10/2004 | Cedar | ................. | G06F 12/0653 710/301 |
| 2007/0286011 A1* | 12/2007 | Chung | ..................... | G11C 7/10 365/230.05 |
| 2014/0013069 A1* | 1/2014 | Mitsuno | ................ | G06F 3/0605 711/162 |

FOREIGN PATENT DOCUMENTS

JP        2002-157165 A       5/2002

* cited by examiner

*Primary Examiner* — Henry Tsai
*Assistant Examiner* — Dean Phan
(74) *Attorney, Agent, or Firm* — Posz Law Group, PLC

(57) ABSTRACT

A data processing device has a communicator that receives, from a data overwriter, first device-specific information that identifies one of the plural same-ID data processing devices as a data overwrite object device having data to be overwritten by the data overwriter. Then, a device-specific information generator in the data processing device generates second device-specific information that is used to determine whether a subject data processing device is the data overwrite object device. Then, a specifier in the subject data processing device specifies that (i) the subject data processing device is the data overwrite object device or (ii) one of other plural same-ID data processing devices other than the subject data processing device is the data overwrite object device, based on a matching between (a) the first device-specific information received from the data overwriter, and (b) the second device-specific information generated by the device-specific information generator.

7 Claims, 10 Drawing Sheets

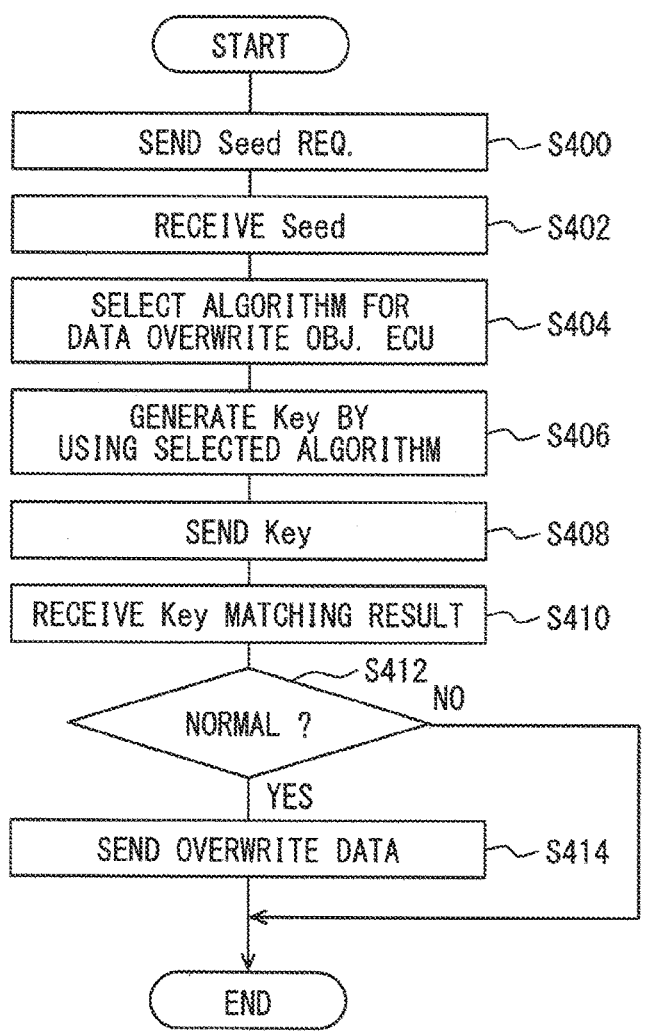

DATA PROCESSING DEVICE

CROSS REFERENCE TO RELATED APPLICATION

The present application is based on and claims the benefit of priority of Japanese Patent Application No. 2016-035632, filed on Feb. 26, 2016, the disclosure of which is incorporated herein by reference.

TECHNICAL FIELD

The present disclosure generally relates to a technique of how a data overwriter identifies one of a plurality of in-vehicle data processing devices as a data overwrite object device for overwriting data stored therein.

BACKGROUND INFORMATION

As disclosed in a patent document, Japanese Patent Laid-Open No. 2002-157165 (patent document 1) listed below, when a data overwriter overwrites data stored in one of the plurality of data processing devices, the data overwriter must first identify a "target" data processing device, or a data overwrite object device, in which device the stored data is overwritten by the data overwriter. Overwrite of the data may also be understood as rewrite of the data.

For example, when the plurality of data processing devices are connected to a network, each of the plurality of data processing devices may have a unique communication ID for their identities, and such communication ID may be used to identify a "target" device, i.e., the data overwrite object device.

However, if a unique communication ID is assigned to each of the data processing devices (i.e., if all data processing devices have respectively different communication IDs), the shortage of the communication IDs may occur.

SUMMARY

It is an object of the present disclosure to provide a technique of how a data overwriter identifies one/each of a plurality of in-vehicle data processing devices as a data overwrite object device for an overwriting of data stored therein.

In one aspect of the present disclosure, the data processing device includes a communicator, a device-specific information generator, and a specifier.

The communicator receives, from a data overwriter, first device-specific information that identifies a data overwrite object device from among plural same-ID data processing devices, and data in the data overwrite object device is overwritten by a data overwriter. The device-specific information generator generates second device-specific information that is used for a determination of whether a subject data processing device is the data overwrite object device.

The specifier specifies that (i) the subject data processing device is the data overwrite object device or (ii) one of other plural same-ID data processing devices other than subject data processing device is the data overwrite object device, based on a matching between (a) the first device-specific information received from the data overwriter by the communicator, and (b) the second device-specific information generated by the device-specific information generator.

According to one embodiment of the present disclosure, the subject data processing device includes the communicator, the device-specific information generator, and the specifier.

In such configuration, even in case the same communication ID is assigned to the plural data processing devices including the subject data processing device, the subject data processing device is identifiable as the data overwrite object device, when a matching between (i) the first device-specific information received from the data overwriter and (ii) the second device-specific information generated by the subject data processing device is determined/confirmed. Further, when (i) the first device-specific information and (ii) the second device-specific information are not matching, the data overwrite object device is identified as one of the plural data processing devices other than subject data processing device.

Therefore, in comparison to a configuration in which each of the plural data processing devices has a different communication ID, identification of the data overwrite object device having data to be overwritten by the data overwriter is more readily enabled (e.g., with only one communication ID), while avoiding the shortage of the communication ID.

The parenthesized numerals in the specification and in the claims show relationships between the concrete components and the claimed elements in a non-limiting manner.

BRIEF DESCRIPTION OF THE DRAWINGS

Objects, features, and advantages of the present disclosure will become more apparent from the following detailed description made with reference to the accompanying drawings, in which:

FIG. 3 is a flowchart of the data overwrite process performed by a data overwriter;

FIG. 4 is a diagram of a table that shows a relationship between a program and a Key generation algorithm;

DETAILED DESCRIPTION

Hereafter, embodiments for implementing the present disclosure are described based on the drawings.

1. First Embodiment

[1-1. Configuration]

Figure 1:
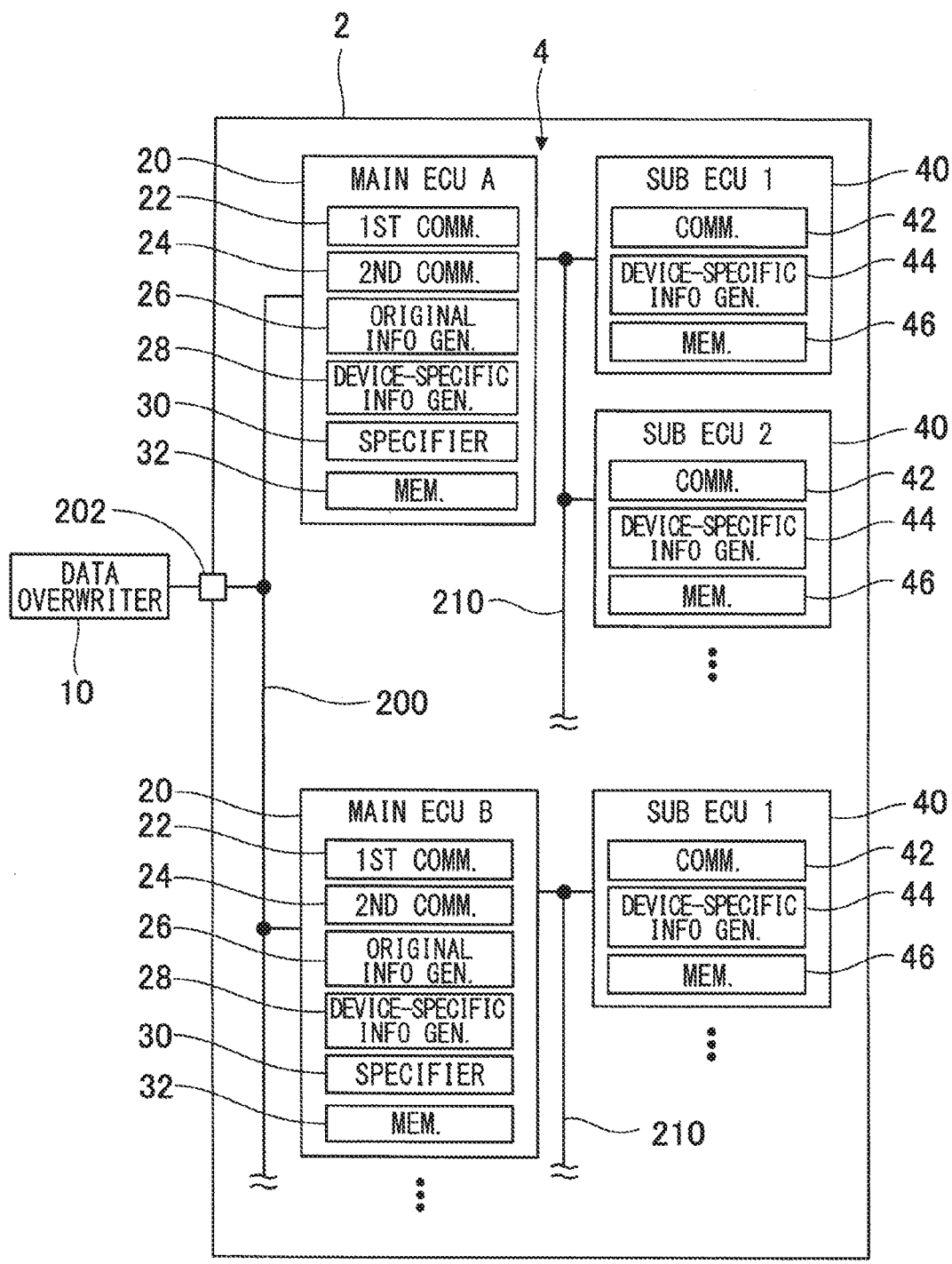
FIG. 1 is a block diagram of a data processing system in a first embodiment of the present disclosure.

A data processing system 4 of the first embodiment shown in FIG. 1 is disposed in a vehicle 2. The data processing system 4 is provided with plural main ECUs 20 and at least one sub ECU 40 connected to each the main ECU 20. "ECU" stands for an "Electronic Control Unit."

The main ECU 20 and the sub ECU 40 are respectively a data processing device which receives an input of the data of the detection signals and the like from various in-vehicle sensors, processes the data, and controls the travel of the vehicle 2. The main ECU 20 corresponds to a first data processing device, and the sub ECU 40 corresponds to a second data processing device.

The plural main ECUs 20 are respectively connected to a general bus 200 of the vehicle 2. Each of the main ECUs 20 and at least one sub ECU 40 connected to the main ECU 20 are respectively connected to a local bus 210.

The general bus 200 and the local bus 210 are respectively a CAN bus, for example. "CAN" is the registered trademark and is an abbreviation of "Controller Area Network".

A data overwriter 10 is connected to a connector 202 for a connection to the general bus 200 of the vehicle 2, when the data overwriter 10 is used to overwrite the data in either of the plural main ECUs 20 and the plural sub ECUs 40. The data that is overwritten by the data overwriter 10 may be a program, or may be data itself, e.g., the control data.

Both of the main ECU 20 and the sub ECU 40 have (i) a microcomputer having a Central Processing Unit (CPU) and a semiconductor memory, e.g., Random Access Memory (RAM), Read-Only Memory (ROM), a flash memory, and the like, and (ii) a CAN controller as a communication interface. The number of microcomputers used in the main ECU 20 and in the sub ECU 40 may be one or other than one (i.e., two or more). Hereafter, the microcomputer may be abbreviated to a "microcomp".

Each of the functions of the main ECU 20 and the sub ECU 40 is mainly realized by the microcomputer and the CAN controller. In case that the microcomputer is used in ECU 20/40, the functions in ECU 20/40 are realized by executing a stored program in a non-transitive and tangible recording media, e.g., ROM, the flash memory, or the like by the CPU. By such an execution of the program, a method implemented by the executed program is realized.

The main ECU 20 is provided with a first communicator 22, a second communicator 24, an original information generator 26, a device-specific information generator 28, a specifier 30, and a memory 32 as the functional components.

The memory 32 corresponds to the RAM, the ROM, and the flash memory of the microcomputer, and memorizes the program, the control data, and the like.

The sub ECU 40 is provided with a communicator 42, a device-specific information generator 44, and a memory 46 as the functional components.

The memory 46 corresponds to the RAM, the ROM, and the flash memory of the microcomputer, and memorizes the program, the control data, and the like.

The functions of the main ECU 20 and the sub ECU 40 may be (i) implemented as software or (ii) implemented as hardware, and (iii) as a single component/software or (iv) as a combination of components/circuits (i.e., a combination of hardware devices).

The data that is overwritten by the data overwriter 10 to replace the existing data (i.e., overwrite data) is data memorized by the flash memory that is a rewritable, nonvolatile memory storage in the memory 32 of the main ECU 20 and in the memory 46 of the sub ECU 40.

The first communicator 22 of the "subject" main ECU 20 is a communication device that is used for communication between (i) the data overwriter 10 and other main ECUs 20 and (ii) the subject main ECU 20 respectively connected to the general bus 200.

The second communicator 24 of the main ECU 20 is a communication device that is used for communication between (i) the sub ECU 40 and (ii) the main ECU 20 respectively connected to the local bus 210.

The communicator 42 of the "subject" sub ECU 40 in a communication device that is used for communication between (i) the main ECU 20 and the other sub ECU 40 and (ii) the subject sub ECU 40 respectively connected to the local bus 210.

The main ECU 20, by using the first communicator 22 and the second communicator 24, relays the communication between (i) the data overwriter 10 connected to the general bus 200 and (ii) the sub ECU 40 connected to the local bus 210.

Each of the plural main ECUs 20 connected to the general bus 200 is enabled to perform a direct communication to the data overwriter 10 by having a CANID, i.e., by having a unique communication Identification (ID) on the general bus 200.

The main ECU 20 and at least one sub ECU 40 connected to each of the local buses 210 are enabled to perform a mutual communication by having a CANID, i.e., by having a unique communication ID in the local bus 210.

The CANID of the general bus 200 and the CANID of the local bus 210 are set up independently.

For the data overwriter 10 (i.e., from a viewpoint of the overwriter 10), the main ECU 20 and the at least one sub ECU 40 connected thereto (i.e., to the main ECU 20) by the local bus 210 are considered as a same CANID device, i.e., as having the same CANID. In the following, the same CANID devices may be designated as an ECU group. That is, the main ECU 20 and the at least one sub ECU 40 connected thereto (i.e., to the main ECU 20) by the local bus 210 are designated as an ECU group.

[1-2. Process]

(1) Entire Process

Figure 2:
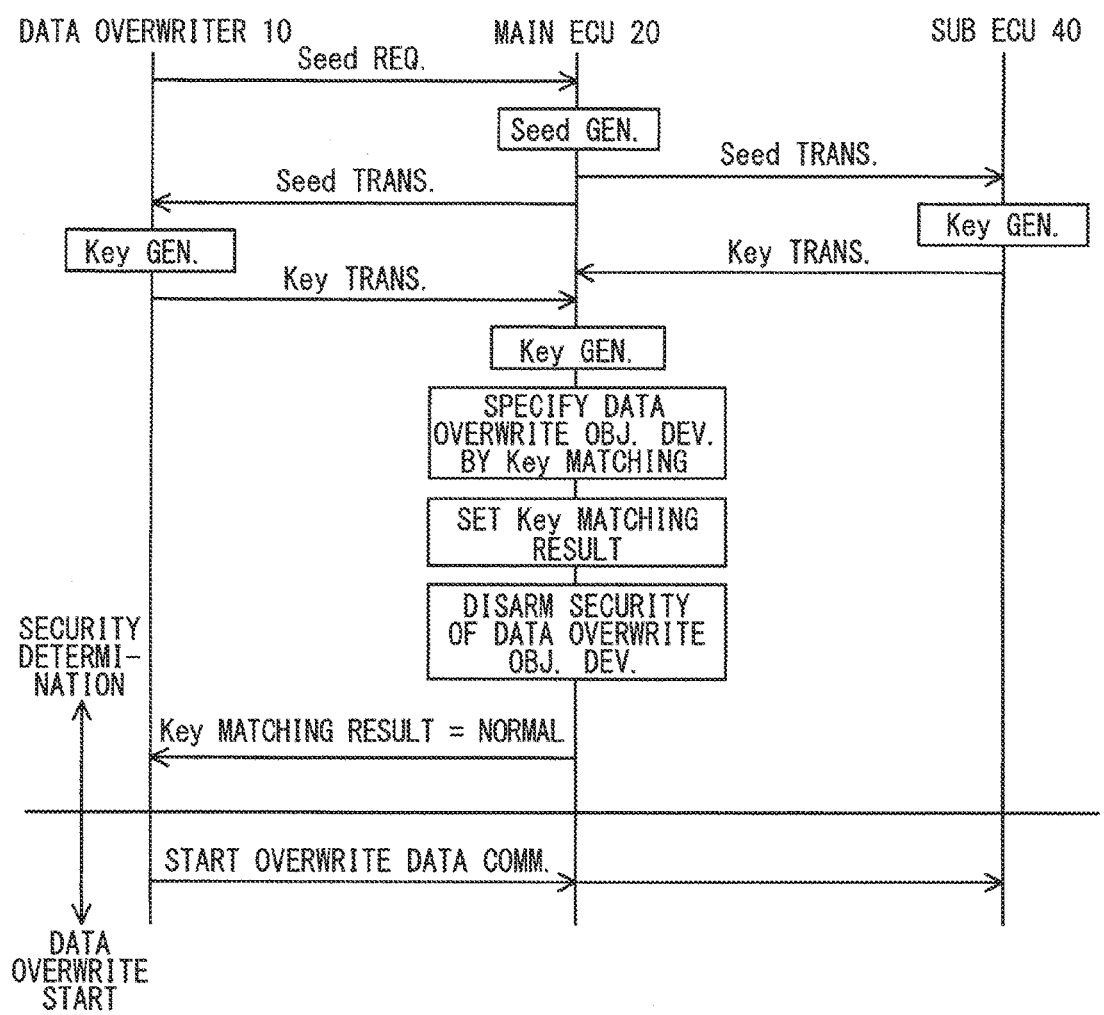
FIG. 2 is a sequence chart of a data overwrite process.

The data overwrite process, which is a combination of processes respectively performed by the data overwriter 10, by the main ECU 20, and by the sub ECU 40, is described based on FIG. 2.

When overwriting data in one of many ECUs in an ECU group, the data overwriter 10 first identifies a data overwrite object ECU group by CANID, and transmits a Seed request. Since only the main ECU 20 in an ECU group can directly communicate with the data overwriter 10, the main ECU 20 identified by CANID receives the Seed request, which is transmitted by the data overwriter 10.

The data overwriter 10 receives "Seed" as original information from the main ECU 20 in the data overwrite object ECU group as a response to the Seed request.

The data overwriter 10 generates "Key" as first device-specific information by using an algorithm that is unique to the data overwrite object device (i.e., object ECU) having data that is going to be overwritten by the data overwriter 10. The data overwriter 10 transmits a generated Key to the data overwrite object ECU group.

When the data overwriter 10 receives, from the data overwrite object ECU group in response to a transmitted Key, a notice that indicates that (i) Key matching result is normal and (ii) a security of the data overwrite object ECU is UNLOCK (i.e., disarmed), the data overwriter 10 transmits the overwrite data and starts a data overwrite.

Every time the main ECU 20 of the data overwrite object ECU group receives the Seed request, the main ECU 20 generates, as the Seed, a data sequence having random values, and transmits generated Seed to the data overwriter 10 and to the sub ECU 40. Further, the main ECU 20 puts the generated Seed in the unique algorithm that is set to the main ECU 20, and generates Key as second device-specific information that is unique to the main ECU 20.

Based on a matching result of the Key generated by the main ECU 20 and the Key received from the sub ECU 40 with respect to the matching with the Key received from the data overwriter 10, the data overwriter 10 identifies an ECU having the matching Key as a data overwrite object device in which the data is overwritten by the data overwriter 10. The main ECU 20 memorizes the specified data overwrite object device.

When the data overwrite object device is one of the sub ECUs 40, the main ECU 20 disarms the security of that (i.e., a subject) sub ECU 40 for a data overwrite by the data overwriter 10, and relays the overwrite data transmitted by the data overwriter 10 to the sub ECU 40.

When the data overwrite object device is the main ECU 20, the main ECU 20 disarms the security of the main ECU 20 for a data overwrite by the data overwriter 10.

The main ECU 20 transmits, to the data overwriter 10, a notice that indicates (i) a Key matching result is normal, indicative of an identification of the data overwrite object device, and (ii) a disarm of the security of either of the main ECU 20 or one of the sub ECUs 40.

At least one sub ECU 40 that (i) is connected to the same local bus 210 as the main ECU 20 and (ii) has received the Seed from the main ECU 20 puts the received Seed in the unique algorithm that is unique to the subject sub ECU 40, and generates Key as third device-specific information that is unique to each of the sub ECUs 40. The sub ECU 40 transmits the generated Key to the main ECU 20.

(2) Process in Each of Data Processing Devices

Next, data processing in each of the data processing devices is described with reference to FIGS. 3, 5, 6, and 7. That is, the process in the data overwriter 10 is described based on FIG. 3, the process in the main ECU 20 is described based on FIGS. 5 and 6, and the process in the sub ECU 40 is described based on a flowchart in FIG. 7.

(2-1) Data Overwrite Process by the Data Overwriter 10

In S400 of FIG. 3, the data overwriter 10 transmits the Seed request to the data overwrite object ECU group, and receives, in S402, Seed from the data overwrite object ECU group as a response to the Seed request.

In S404, the data overwriter 10 selects an algorithm that corresponds to the data overwrite object device (i.e., an ECU) from a table 300 shown in FIG. 4.

In S406, the data overwriter 10 puts the received Seed in the selected algorithm (i.e., GENERATE Key BY USING SELECTED ALGORITHM), and generates Key for identifying the data overwrite object device.

The table 300 shown in FIG. 4 is a reference table that shows a relationship between (i) the programs respectively memorized in the memory 32 of the main ECU 20 and in the memory 46 of the sub ECU 40 and (ii) the algorithms for generating Key from Seed that are set for respective programs.

For example, a program memorized in the memory 32 of a main ECU 20 is designated as A_PROG, and programs memorized in the memory 46 of sub ECUs 40 that are connected to the same local bus 210 as the main ECU 20 are designated as a1_PROG and a2_PROG, as an assumption.

Then, the algorithms that respectively correspond to A_PROG, a1_PROG, and a2_PROG are designated as A_ALGO, a1_ALGO, and a2_ALGO.

Each algorithm is unique to the program that is memorized in either of the plural main ECUs 20 and the plural sub ECUs 40 shown in FIG. 1.

When the data overwrite object device is the main ECU 20 which memorizes A_PROG, the data overwriter 10 puts the received Seed in A_ALGO, and generates Key unique to the main ECU 20 that memorizes A_PROG, for example.

When the data overwrite object device is the sub ECU 40 that memorizes a2_PROG, the data overwriter 10 puts the received Seed in a2_ALGO, and generates Key unique to the sub ECU 40 that memorizes a2_PROG.

Note that the table 300 of FIG. 4 shows an example in which the overwrite data to be overwritten by the data overwriter 10 is a program. Thus, when the data to be overwritten by the data overwriter 10 is a control data, a reference table is set up to show a relationship between the control data and the Key generation algorithms. The overwrite data may be a mixture of the programs and the control data. Further, one ECU has plural, or more than one piece of data, i.e., more than one program or more than one piece of control data, as the overwrite data.

In S408, the data overwriter 10 transmits (i.e., SEND in FIG. 3) the generated Key to the data overwrite object ECU group.

In S410, the data overwriter 10 receives the Key matching result from the data overwrite object ECU group.

When the determination of S412 is No, i.e., when the received matching result is abnormal, the data overwriter 10 does not perform a data overwrite process to the data overwrite object device, and finishes the present process.

When the determination of S412 is Yes, i.e., when the received matching result is normal, the data overwriter 10 transmits the overwrite data to the data overwrite object ECU group in S414.

The main ECU 20 of the data overwrite object ECU group overwrites the data memorized in the memory 32 of itself with the received overwrite data, when the main ECU 20 itself is the data overwrite object device, when the main ECU 20 receives the overwrite data from the data overwriter 10. More practically, an overwrite object part of the data in the memory 32 is overwritten by the received overwrite data.

When the data overwrite object device is one of the sub ECUs 40, the main ECU 20 transmits the overwrite data to the object sub ECU 40. The sub ECU 40 receiving the overwrite data overwrites the data memorized in the memory 46 with the received overwrite data. More practically, an overwrite object part of the data in the memory 46 is overwritten by the received overwrite data.

(2-2) Data Overwrite Process by the Main ECU 20

Figure 5:
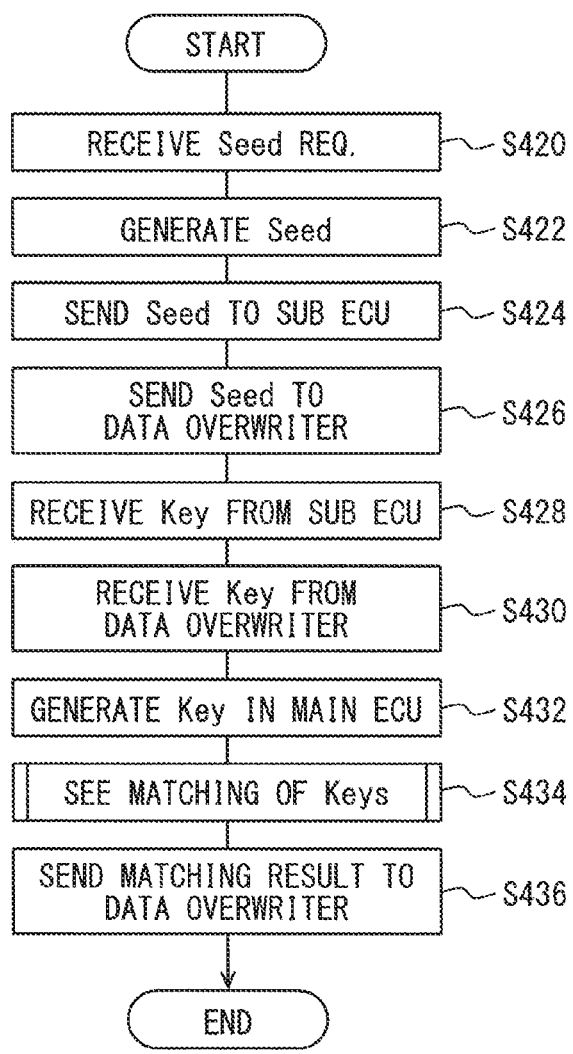
FIG. 5 is a flowchart of the data overwrite process performed by a main ECU.

In a data overwrite process in S420 of FIG. 5, when the first communicator 22 receives the Seed request from the data overwriter 10, in S422, the original information generator 26 generates Seed, which is a random data sequence.

In S424, the second communicator 24 transmits, i.e., SEND in FIG. 5, the generated Seed to the sub ECU 40, and, in S426, the first communicator 22 transmits, or sends, the generated Seed to the data overwriter 10.

In S428, the second communicator 24 receives, from the sub ECU 40, Key which is generated by the sub ECU 40 with the algorithm unique to the sub ECU 40.

In S430, the first communicator 22 receives, from the data overwriter 10, Key generated by the data overwriter 10 for identifying the data overwrite object device.

In S432, the device-specific information generator 28 puts the self-generated Seed in the algorithm unique to the main ECU 20, and generates Key.

In S434, the specifier 30 sees the matching of the Keys, i.e., whether the received Key from the data overwriter 10 matches (i) the generated Key from the device-specific information generator 28 or (ii) the received Key from the sub ECU 40, and specifically identifies the data overwrite object device in which the data is overwritten by the data overwriter 10. The details of this matching process are mentioned later with reference to FIG. 6.

In S436, the first communicator 22 transmits, or sends, the matching result in S434 to the data overwriter 10.

(2-3) Data Matching Process by Main ECU 20

The details of the matching process of S434 in FIG. 5 are described with reference to FIG. 6. In S440 of FIG. 6, the specifier 30 determines whether the received Key from the data overwriter 10 and the generated Key generated by the device-specific information generator 28 match with each other.

When the determination of S440 is No, i.e., when the received Key from the data overwriter 10 and the generated Key generated by the device-specific information generator 28 do not match with each other, the process proceeds to S446.

When the determination of S440 is Yes, i.e., when the received Key from the data overwriter 10 and the generated Key generated by the device-specific information generator 28 match with each other, the specifier 30 identifies that the main ECU 20 is the data overwrite object device in which the data is overwritten by the data overwriter 10.

In such case, in S442, the specifier 30 memorizes that the main ECU 20 is the data overwrite object device of the current cycle of process, and disarms the security of the main ECU 20 for a data overwrite by the data overwriter 10.

By memorizing that the main ECU 20 is the data overwrite object device in the current cycle of process, the overwrite data received from the data overwriter 10 is recognized as the overwrite data for the main ECU 20.

Further, in S444, the specifier 30 sets a communication mode of the data overwriter 10 to the main ECU 20 as unlock.

The specifier 30 permits a data overwrite by the data overwriter 10 to the memory 32 of the main ECU 20 by performing S442 and S444.

When S444 is performed, the process proceeds to S452.

In S446, the specifier 30 determines whether the received Key from the data overwriter 10 and any received Key among received Keys from the sub ECUs 40 match with each other.

When the determination of S446 is No, i.e., when any Key received from the sub ECUs 40 and the received Key from the data overwriter 10 do not match with each other, in S454, the specifier 30 sets a Key matching result to abnormal.

When the determination of S446 is Yes, i.e., when the received Key from the data overwriter 10 and any received Key among received Keys from the sub ECUs 40 match with each other, in S448, the specifier 30 disarms the security of the sub ECU 40 from which a matching Key matching with the one from the data overwriter 10 is received.

In S448, the specifier 30 memorizes that the sub ECU 40 whose Key matches the Key from the data overwriter 10 is the data overwrite object device.

By memorizing a sub ECU 40 as the data overwrite object device, when the overwrite data is received from the data overwriter 10, the main ECU 20 can identify such sub ECU 40 on the local bus 210 as the data overwrite object device by CANID, and can transmit the overwrite data to such sub ECU 40.

In S450, the specifier 30 sets the communication mode of the data overwriter 10 to the sub ECU 40 as unlock.

The specifier 30 permits a data overwrite by the data overwriter 10 to the memory 46 of the sub ECU 40 that has the matching Key by performing S448 and S450. When S450 is performed, the process proceeds to S452.

In S452, the specifier 30 sets a Key matching result as normal.

(2-4) Data Overwrite Process by the Sub ECU 40

Figure 7:
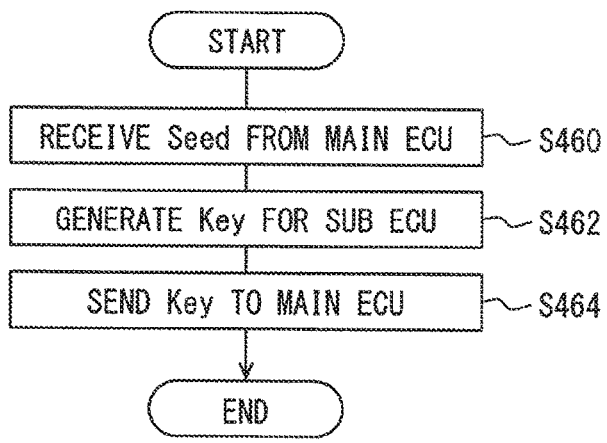
FIG. 7 is a flowchart of the data overwrite process performed by a sub ECU.

In S460 of the data overwrite process by the sub ECU 40 shown in FIG. 7, the communicator 42 receives Seed from the main ECU 20.

In S462, the device-specific information generator 44 puts the received Seed in the unique algorithm that is unique to the sub ECU 40, and generates Key (i.e., GENERATE Key IN SUB ECU in FIG. 7).

In S464, the communicator 42 transmits, or sends, the generated Key generated by the device-specific information generator 44 to the main ECU 20.

[1-3. Effects]

According to the first embodiment described above, the following effects are achievable.

(1) One main ECU 20 that is "on", i.e., is connected to, the general bus 200 and at least one sub ECU 40 "on", i.e., is connected to, the same local bus 210 as the one main ECU 20 have the same CANID in a "view" from the data overwriter 10 that is connected to the general bus 200.

When overwriting the data in one of the ECUs in a certain ECU group, the data overwriter 10 generates Key from Seed by the algorithm unique to the data overwrite object device (i.e., ECU) based on the relationship shown in the table 300, because the data overwriter 10 "knows" the data overwrite object device.

Each of the ECUs in one ECU group generates Key from Seed with a unique algorithm that is unique to the respective ECUs.

Then, by determining the matching between the Keys, i.e., by seeing which one of the Keys generated by the ECUs in an ECU group matches the Key generated by the data overwriter 10, even when the same CANID is shared among the plural ECUs, the main ECU 20 can identify the data overwrite object device in which the data is overwritten by the data overwriter 10. Thereby, shortage of CANID in the general bus 200 is resolved (i.e., will not happen).

(2) Every time a Seed request from the data overwriter 10 is received, the main ECU 20 generates a data sequence having random values as the Seed. Therefore, the main ECU 20 generates a different Seed for every Seed request. Then, the main ECU 20 identifies the data overwrite object device by seeing the matching of the Keys generated from such a different Seed by the data overwriter 10, by the main ECU 20, and by the sub ECU 40, thereby the security for identifying the data overwrite object device is improved.

2. Second Embodiment

[2-1. Configuration]

Figure 8:
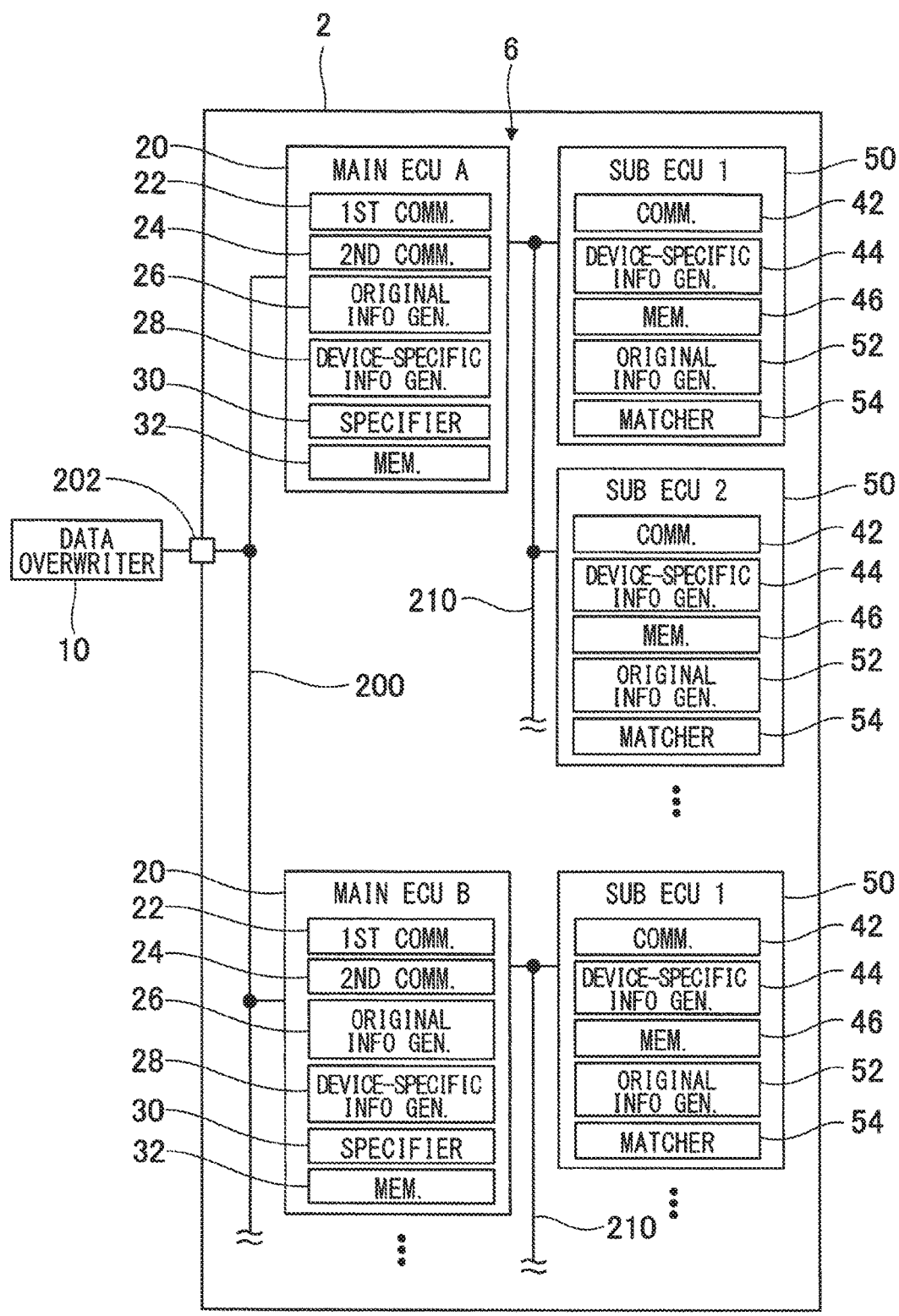
FIG. 8 is a block diagram of the data processing system in a second embodiment of the present disclosure.

Regarding the second embodiment of the present disclosure shown in FIG. 8, a data processing system 6 is described with the same numerals for the same parts as the data processing system 4 in the first embodiment. Please refer to the first embodiment about the parts having the same numerals.

A sub ECU 50 of the second embodiment has, in addition to having the communicator 42, the device-specific information generator 44, and the memory 46, an original information generator 52 and a matcher 54, which are the difference from the sub ECU 40 of the first embodiment.

[2-2. Process]

In the second embodiment, in addition to a determination of whether the data overwrite process of the first embodiment is normal, a data overwrite process to the sub ECU 50 is determined as to whether such a process is normal.

(1) Main ECU 20

Figure 6:
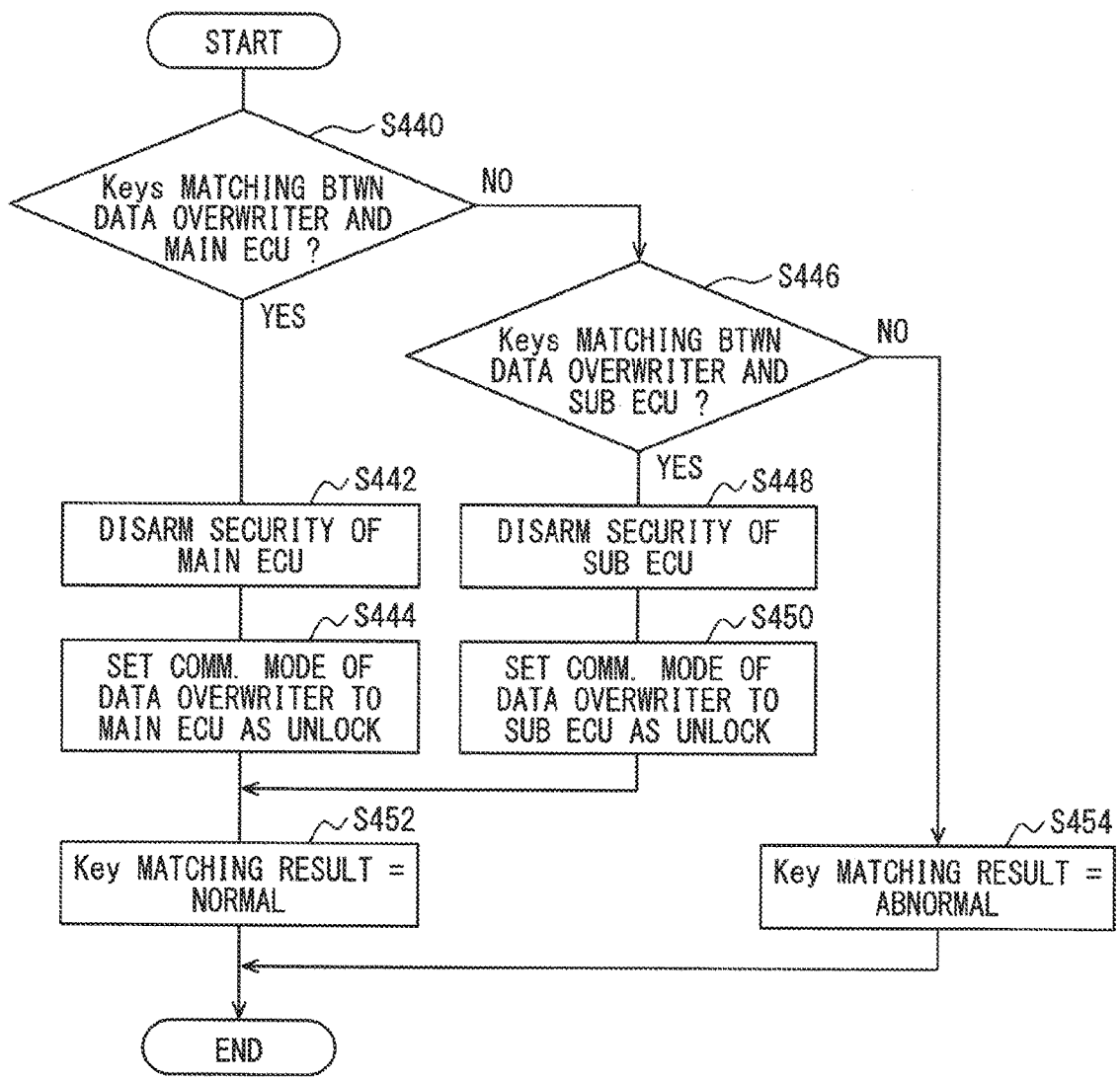
FIG. 6 is a flowchart of a data matching process performed by the main ECU.
Figure 9:
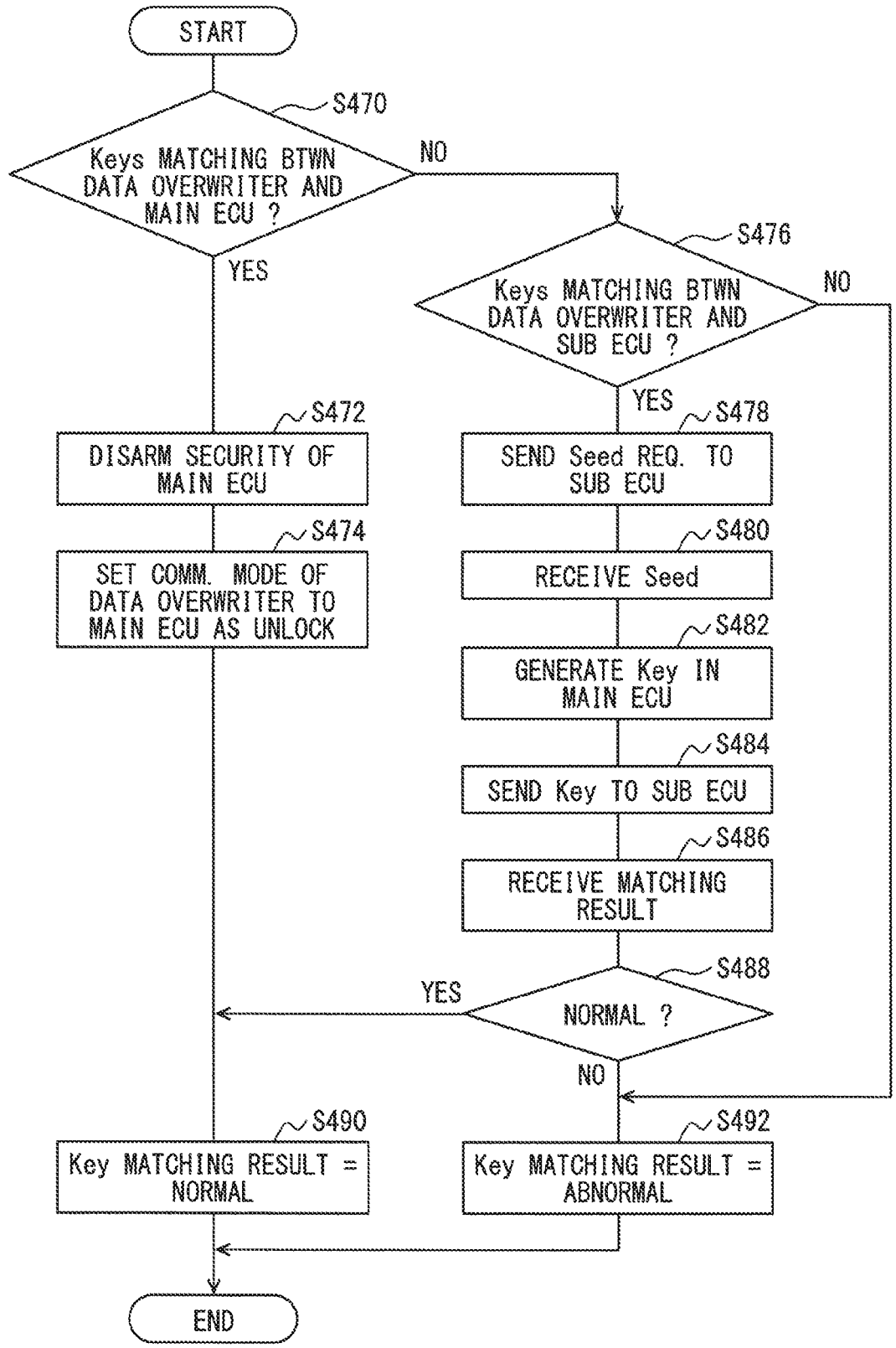
FIG. 9 is a flowchart of the data overwrite process performed by the main ECU.

Since the process in S470-S476 of FIG. 9 that is performed by the main ECU 20 is substantially the same as the process in S440-S446 of FIG. 6, description of such process is omitted from the second embodiment.

In S478 of FIG. 9, the second communicator 24 transmits the Seed request to the sub ECU 50 that has a matching Key with the data overwriter 10.

In S480, the second communicator 24 receives Seed from the sub ECU 50.

In S482, the device-specific information generator 28 puts the received Seed in the algorithm unique to the sub ECU 50 that has a matching Key with the data overwriter 10, and generates Key (i.e., GENERATE Key IN MAIN ECU in FIG. 9).

In S484, the second communicator 24 transmits the generated Key to the sub ECU 50.

That is, in the second embodiment, the main ECU 20 memorizes the algorithms used in a Key generation for all of the sub ECUs 50 that are connected to the main ECU 20 via the local bus 210.

In S486, the second communicator 24 receives the Key matching result from the sub ECU 50.

In S488, the specifier 30 determines whether the received matching result is normal. When the determination of S488 is Yes, i.e., when the matching result is normal, in S490, the specifier 30 sets the matching result as normal. When the determination of S488 is No, i.e., when the matching result is abnormal, in S492, the specifier 30 sets the matching result as abnormal.

(2) sub ECU 50 (One of Plural Sub ECUs 50)

Figure 10:
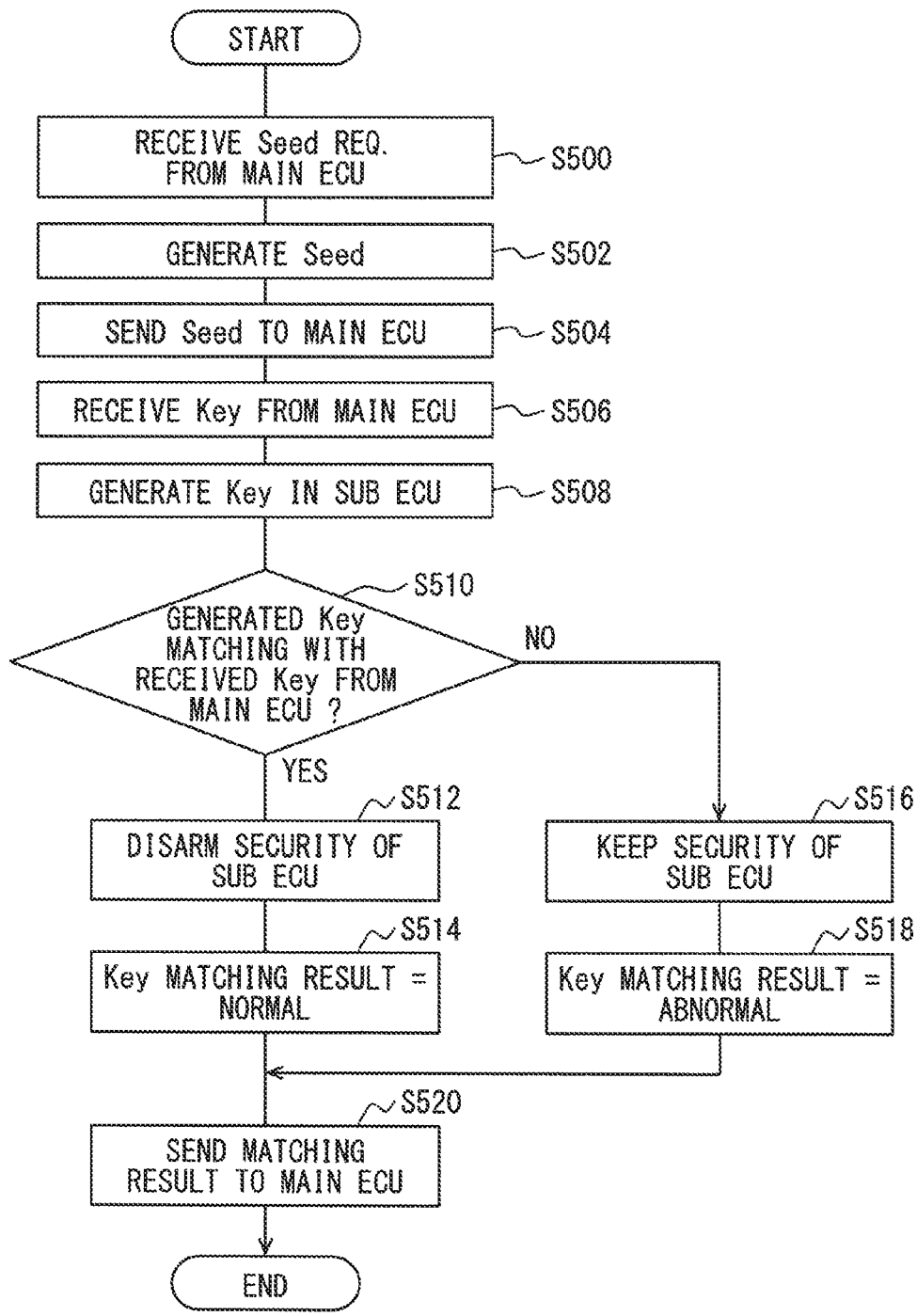
FIG. 10 is a flowchart of the data overwrite process performed by the sub ECU.

In S500 of FIG. 10, the communicator 42 receives the Seed request from the main ECU 20.

In S502, the original information generator 52 generates, as Seed, the data sequence having random values.

In S504, the communicator 42 transmits the generated Seed to the main ECU 20.

In S506, the communicator 42 receives, from the main ECU 20, the generated Key generated by the main ECU 20.

In S508, the device-specific information generator 44 puts the generated Seed generated by the original information generator 52 in the algorithm that is unique to the sub ECU 50, and generates Key (i.e., GENERATE Key AT SUB ECU in FIG. 10).

In S510, the matcher 54 determines whether the generated Key generated by the device-specific information generator 44 (i.e., in the sub ECU 50) and the received Key from the main ECU 20 match with each other.

When the determination of S510 is Yes, i.e., when the generated Key generated by the device-specific information generator 44 and the received Key from the main ECU 20 match with each other, in S512, the matcher 54 disarms the security of the sub ECU 50.

In S514, the matcher 54 sets the Key matching result as normal, and the process proceeds to S520.

When the determination of S510 is No, i.e., when the generated Key generated by the device-specific information generator 44 and the received Key from the main ECU 20 do not match, in S516, the matcher 54 keeps, i.e., does not disarm, the security of the sub ECU 50.

In S518, the matcher 54 sets the Key matching result as abnormal, and the process proceeds to S520.

Since the sub ECU 50 keeps the security when the generated Key generated by the device-specific information generator 44 in the sub ECU 50 and the received Key from the main ECU 20 are not matching, even when the overwrite data is transmitted from the main ECU 20, the sub ECU 50 does not overwrite the data in the memory 46.

In S520, the communicator 42 transmits the Key matching result to the main ECU 20.

[2-3. Effects]

According to the second embodiment described above, in addition to the effects of the first embodiment, the following effects are achievable.

Matching between the Keys, i.e., one of which is generated by the main ECU 20 and the other of which is generated by the sub ECU 50, is examined. Depending on the matching result, it is determined whether the data overwrite process to the sub ECU 50 is normal.

Since an unauthorized main ECU does not know the algorithm with which the sub ECU 50 generates Key from Seed, the generated Key generated by the main ECU 20 does not match the generated Key generated by the sub ECU 50. Thereby, the matching result by the sub ECU 50 is set as abnormal. Therefore, the unauthorized main ECU cannot overwrite the data in the sub ECU 50.

3. Third Embodiment

[3-1. Configuration]

Figure 11:
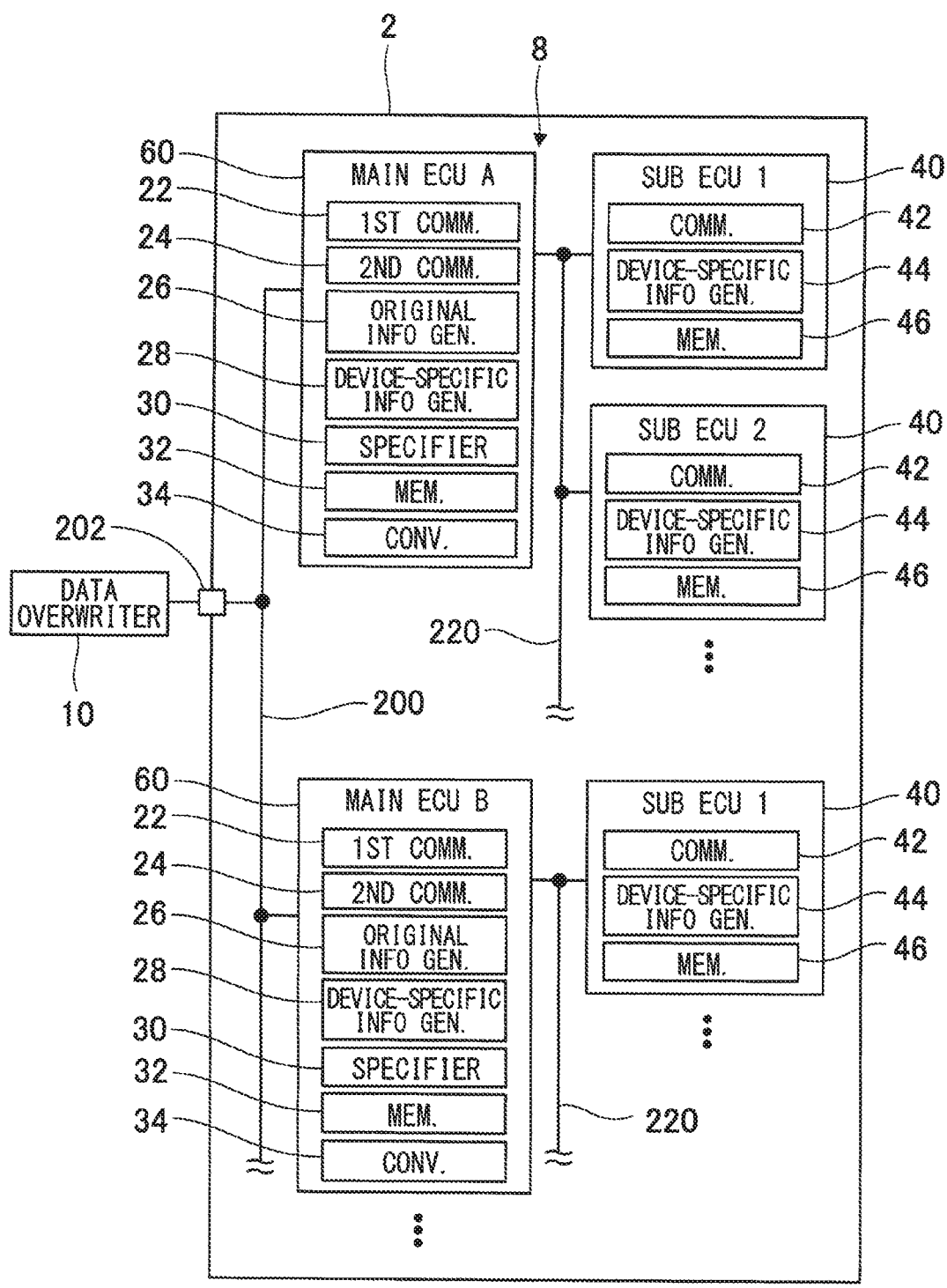
FIG. 11 is a block diagram of the data processing system in a third embodiment of the present disclosure.

Regarding the third embodiment of the present disclosure shown in FIG. 11, the same numerals are assigned to the same parts/configuration as the first embodiment, pointing to the description thereof.

An in-vehicle data processing system 8 has a local bus 220 that connects a main ECU 60, and the sub ECU 40 is a bus that uses a different communication protocol from the general bus 200 that is the CAN bus.

For example, the communication protocol of the local bus 220 is LIN, Ethernet, or the like. LIN is an abbreviation for Local Interconnect Network. Ethernet is a registered trademark.

The main ECU 60 has a converter 34 that converts one communication protocol of the general bus 200 and the local bus 220 to the communication protocol of the other, in order to relay communication between the data overwriter 10 and the sub ECU 40.

[3-2. Effects]

According to the third embodiment, in addition to the effects of the first embodiment, the following effects are achievable.

Since the converter 34 converts one communication protocol to the other communication protocol for the communication between the general bus 200 and the local bus 220, i.e., for relaying communication between the data overwriter 10 and the sub ECU 40, flexibility/freedom of the setup of the communication protocol for the general bus 200 and the local bus 220 is improved.

4. Fourth Embodiment

[4-1. Configuration]

Figure 12:
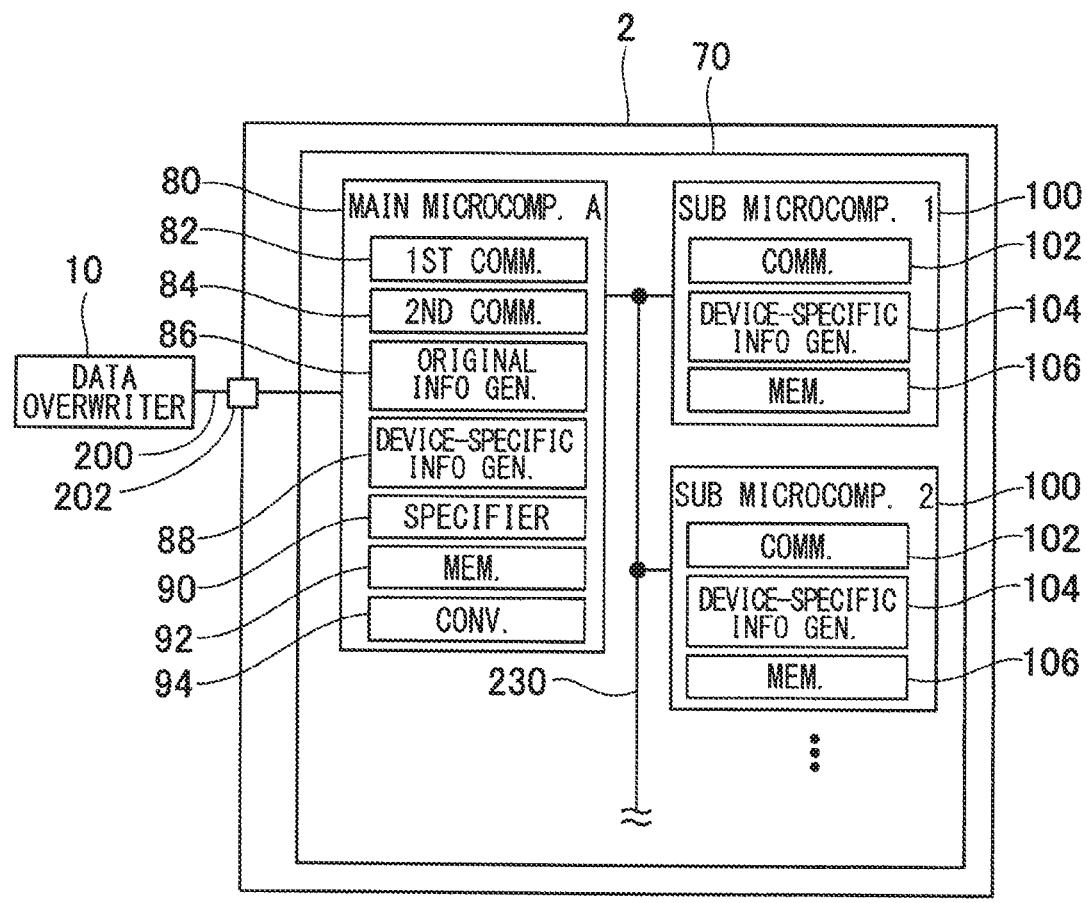
FIG. 12 is a block diagram of the data processing system in a fourth embodiment of the present disclosure.

Regarding the fourth embodiment of the present disclosure shown in FIG. 12, the same numerals are assigned to the same parts/configuration as the third embodiment, pointing to the description thereof.

An in-vehicle data processing system 70 has one main microcomputer 80 and plural sub microcomputers 100.

The data processing system 70 corresponds to the data processing system 8 of the third embodiment, the main microcomputer 80 corresponds to the main ECU 60 of the third embodiment, and the sub microcomputer 100 corresponds to the sub ECU 40 of the third embodiment. Note that the data processing system 70 may be one of plural main ECUs 20 of the third embodiment.

Regarding the main microcomputer 80, a first communicator 82, a second communicator 84, and an original information generator 86, a device-specific information generator 88, a specifier 90, a memory 92 and a converter 94 respectively correspond to the first communicator 22, the second communicator 24, the original information generator 26, the device-specific information generator 28, the specifier 30, the memory 32 and the converter 34 of the main ECU 20 of the third embodiment.

Further, regarding the sub microcomputer 100, a communicator 102, a device-specific information generator 104, and a memory 106 respectively correspond to the communicator 42, the device-specific information generator 44, and the memory 46 of the sub ECU 40 of the third embodiment.

The data overwriter 10 and the data processing system 70 are connected to the general bus 200 by a connector 202. One main microcomputer 80 and plural sub microcomputers 100 are connected to a local bus 230 that uses a different communication protocol from the general bus 200.

Since the configuration of the data overwriter 10 and the data processing system 70 corresponds to the data processing system 8 of the third embodiment, the description about the configuration of the data overwriter 10 and the data processing system 70 is omitted.

The data overwriter 10 performs a data overwrite process to the one main microcomputer 80 or to the plural sub microcomputers 100 in the data processing system 70.

Therefore, the data overwriter 10 memorizes, similar to the table 300 of the first embodiment, the relationship between (i) the algorithms with which the one main microcomputer 80 and the plural sub microcomputers 100 generate Key from Seed and (ii) the overwrite object programs in those microcomputers.

[4-2. Process]

In the data overwrite process, the main microcomputer 80 corresponds to the main ECU 20 of the first embodiment, and the sub microcomputer 100 corresponds to the sub ECU 40 of the first embodiment.

Therefore, description of the data overwrite process in the data overwriter 10, the main microcomputer 80, and the sub microcomputer 100 is omitted.

[4-3. Effects]

According to the fourth embodiment, the data overwrite process performed by the data overwriter 10 to overwrite the data in the main microcomputer 80 and in the sub microcomputer 100 achieves the same effects as the data overwrite process of the third embodiment.

In the above-mentioned embodiments, the main ECUs 20 and 60, the sub ECUs 40 and 50, the main microcomputer 80, and the sub microcomputer 100 respectively correspond to a data processing device in the claims.

In the above-mentioned embodiment, the main ECUs 20 and 60 and the main microcomputer 80 correspond to a first data processing device in the claims, and the sub ECUs 40 and 50 and the sub microcomputer 100 correspond to a second data processing device in the claims.

In the above-mentioned embodiment, the communicator 42 of the sub ECUs 40 and 50 and the communicator 102 of the sub microcomputer 100 correspond to a third communicator in the claims.

The device-specific information generator 28 of the main ECUs 20 and 60 and the device-specific information generator 88 of the main microcomputer 80 respectively correspond to a first device-specific information generator in the claims, and the device-specific information generator 44 of the sub ECUs 40 and 50 and the device-specific information generator 104 of the sub microcomputer 100 respectively correspond to a device-specific information generator in the claims.

In the above-mentioned embodiment, the process of S420, S426, S430, and S436 corresponds to the process performed by the first communicators 22 and 82 in the claims.

The process of S422 corresponds to the process performed by the original information generators 26 and 86 in the claims.

The process of S424, S428, S478, S480, S484, and S486 corresponds to the process performed by second communicators 24 and 84 in the claims.

The process of S432 and S482 corresponds to the process performed by the device-specific information generators 28 and 88 in the claims.

The process of S434, S440-S454, S470-S476, S488-S492 corresponds to the process performed by the specifiers 30 and 90 in the claims.

In the above-mentioned embodiment, the process of S460 and S464 corresponds to the process performed by third communicator in the claims.

The process of S462 corresponds to the process performed by the second device-specific information generators 44 and 94 in the claims.

In the above-mentioned first, third, and the fourth embodiments, the generated Key generated by the data overwriter 10 corresponds to first device-specific information in the claims.

Seed generated by the main ECUs 20 and 60 corresponds to original information in the claims, Key generated by the main ECUs 20 and 60 corresponds to second device-specific information in the claims, and Key generated by the sub ECUs 40 and 50 and the sub microcomputer 100 corresponds to third device-specific information in the claims.

In the above-mentioned second embodiment, Seed generated by the main ECU 20 corresponds to first original information in the claims, and Seed generated by the sub ECU 50 corresponds to second original information in the claims, and Key generated by the main ECU 20 from Seed that has been generated by the sub ECU 50 as the second original information corresponds to fourth device-specific information in the claims.

5. Other Embodiments (1) According to the above-mentioned embodiments, for identifying the overwrite object device in which the data is overwritten by the data overwriter 10, a Seed & Key method is adopted in which Key is the device-specific information and Seed for generating Key is the original information.

However, other methods such as a Challenge-Response method, a Time-Synchronization method and the like may be adopted for identifying the data overwrite object device.

(2) According to the above-mentioned embodiments, one data overwrite object device is identified from among the main ECU and the plural sub ECUs connected to the local bus all sharing the same communication ID.

However, one data overwrite object device may be identified from among the plural data processing devices having the same communication ID which are connected to the same bus as the data overwriter.

In such case, since each of the plural data processing devices can directly communicate with the data overwriter, each of the plural data processing devices can determine that the data processing device itself (i.e., the self device) is the data overwrite object device based on the device-specific information transmitted from the data overwriter, or may determine that the other data processing device other than the self device is the data overwrite object device based on the device-specific information transmitted from the data overwriter.

Further, from among the plural data processing devices, one data processing device may serve as the main data processing device and the other data processing devices may serve as the sub data processing devices.

In such case, the main data processing device may determine which one of the plural data processing devices is the data overwrite object device based on whether the first device-specific information transmitted from the data overwriter matches (i) the second device-specific information generated by the subject main data processing device or (ii) the third device-specific information transmitted from the sub data processing device.

By matching/comparing (i) Key that is transmitted from the data overwriter and (ii) Key that is generated for each of the plural programs or for each of the plural pieces of data memorized in the data overwrite object device, which one of the plural programs/plural pieces of data is the overwrite object is identifiable.

(4) In the above-mentioned embodiment, the data overwriter 10 is connected to the vehicle 2 via a cable with the connector 202, i.e., is connected to the vehicle 2 with wire. However, the data overwriter 10 may be connected to the vehicle 2 wirelessly.

(5) Plural functions of one component in the above-described embodiments may be divided and distributed to plural components, or vice versa. Also, one function of one component may be collectively implemented/realized by a combination of plural components, and one function realized by a combination of plural components may be realized by only one component.

Further, a part of the configuration of the above-described embodiments may be omitted.

Further, a part of the configuration of the above-described embodiments may be replaced with other configuration(s), or may be added to other embodiments.

The technical thought identified by the claimed words may take various forms without being limited to the claimed form.

(6) The present disclosure may be not only implemented as the above-described data processing device, but also be implemented as a data processing system including such data processing device, a program for operating a computer as the data processing device, a storage medium for storing such a program for operating a computer as the data processing device, a data processing method, and the like.

Although the present disclosure has been described in connection with preferred embodiment thereof with reference to the accompanying drawings, it is to be noted that various converts and modifications will become apparent to those skilled in the art, and such changes, modifications, and summarized schemes are to be understood as being within the scope of the present disclosure as defined by appended claims.

What is claimed is:

1. A data processing device comprising:
a communicator configured to receive a first key from a data overwriter that identifies an object device to be overwritten by the data overwriter from among a plurality of data processing devices having a same ID, the data processing device included as one of the plurality of data processing devices having the same ID;
a device-specific information generator configured to generate a second key for determining whether the data processing device is the object device to be overwritten by the data overwriter; and
a specifier configured to specify based on a matching between the first key and the second key whether
(i) the data processing device is the object device to be overwritten by the data overwriter, or
(ii) another of the plurality of data processing devices is the object device to be overwritten by the data overwriter, wherein
the communicator includes:
a first communicator configured to communicate with the data overwriter, and
a second communicator configured to communicate with the other of the plurality of data processing devices and to receive a third key from the other of the plurality of data processing devices to determine whether the other of the plurality of data processing devices is the object device to be overwritten by the data overwriter; and
the specifier is further configured to specify that the other of the plurality of processing devices is the object device to be overwritten by the data overwriter based on whether the first key matches (i) the second key or (ii) the third key.

2. The data processing device of claim 1 further comprising:
an original information generator generating a seed, when an original information generation request from the data overwriter is received by the first communicator, the original information generation request requesting the seed that is used for generating the first key, wherein
the first communicator transmits the seed generated by the original information generator to the data overwriter, and receives the first key from the data overwriter, in response to a transmission of the seed to the data overwriter,
the second communicator transmits the seed to the other of the plurality of data processing devices, and receives the third key from the other of the plurality of data processing devices, in response to a transmission of the seed to the other of the plurality of data processing devices, and
the device-specific information generator generates the second key from the seed.

3. The data processing device of claim 2, wherein
the device-specific information generator generates the second key from the seed based on an algorithm that is set in the data processing device.

4. The data processing device of claim 1, wherein
1) the device-specific information generator further generates a fourth key that enables the object device to determine whether a data overwrite process caused by a communication of the second communicator for overwriting the data in the object device is a normally-performed process, and
2) the second communicator transmits the fourth key generated by the device-specific information generator to the object device, and receives, from the object device, a determination result of whether the data overwrite process for overwriting the data in the object device is the normally-performed process, when the specifier specifies one of data processing devices as the object device based on a matching of the first key and the third key from one of the other of the plurality of data processing devices.

5. The data processing device of claim 2, wherein the original information is designated as first original information, and
1) the second communicator transmits, to the object device, a second original information generation request requesting the object device to generate a second seed, for the device-specific information generator to generate a fourth key that enables the object device to determine whether a data overwrite process caused by a communication of the second communicator for overwriting the data in the object device is a normally-performed process,
2) the device-specific information generator generates the fourth key from the second seed that is received from the object device by the second communicator, and wherein
3) the second communicator transmits, to the object device, the fourth key generated by the device-specific information generator, and receives, from the object device, a determination result of whether the data overwrite process for overwriting the data in the object device is the normally-performed process, when the specifier specifies one of the other of the plurality of data processing devices as the object device based on a matching of the first key and the third key from the other of the plurality of data processing devices.

6. The data processing device of claim 1 further comprising:
a converter converting a communication protocol for a communication between the first communicator and the second communicator to relay a communication between the overwriter and the other of the plurality of data processing devices, wherein
a communication protocol for a communication between the first communicator and the overwriter is different from a communication protocol for a communication between the second communicator and the other of the plurality of data processing devices.

7. A data processing system comprising:
a first data processing device; and
at least one second data processing device, wherein
the first data processing device and the at least one second data processing device respectively serve as one of a plurality of same-ID data processing devices, and
the first data processing device includes:
a first communicator receiving, from a data overwriter, a first key that identifies one of the plurality of same-ID data processing devices as a object device, data in the object device being overwritten by the data overwriter;
a first device-specific information generator generating a second key that is used for a determination of whether a subject data processing device is the object device;
a second communicator receiving, from the second data processing device, a third key that is used for a determination of whether the second data processing device is the object device; and
a specifier specifying that one of the plurality of same-ID data processing devices is the object device based on a matching between (a) the first key received from the data overwriter by the first communicator and (b) (i) the second key generated by the device-specific information generator or (ii) the third key received from the second data processing device by the second communicator, and
the second data processing device includes:
a second device-specific information generator generating the third key that is used for a determination of whether the second data processing device is the object device; and
a third communicator transmitting, to the first data processing device, the third key generated by the second device-specific information generator.

* * * * *